April 22, 1969     HARUO TESHI ET AL     3,439,980
SMALL-SIZED MOTION-PICTURE PROJECTOR
Filed Dec. 20, 1965
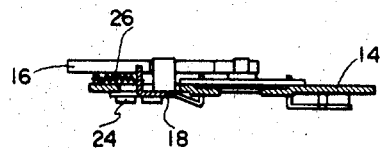
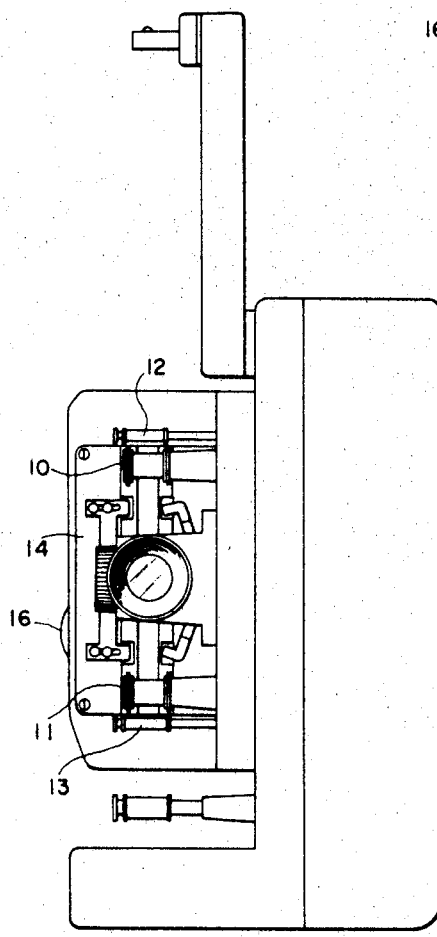
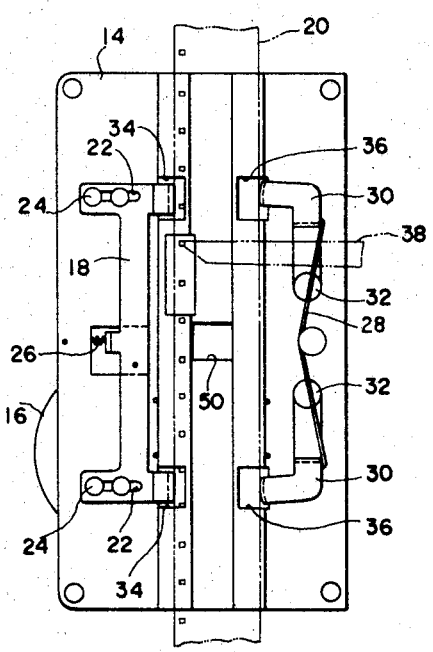
Haruo Teshi and
Seki Kono, Inventors
By Wenderoth, Lind and Ponack,
Attorneys April 22, 1969   HARUO TESHI ET AL   3,439,980
SMALL-SIZED MOTION-PICTURE PROJECTOR
Filed Dec. 20, 1965   Sheet 2 of 2

United States Patent Office 3,439,980
Patented Apr. 22, 1969

3,439,980
SMALL-SIZED MOTION-PICTURE PROJECTOR
Haruo Teshi and Seki Kono, Nagoya, Japan, assignors to Elmo Company Limited, Nogoya, Japan
Filed Dec. 20, 1965, Ser. No. 515,074
Claims priority, application Japan, Dec. 28, 1964, 39/74,179
Int. Cl. G03b 1/48, 41/00
U.S. Cl. 352—79                3 Claims

ABSTRACT OF THE DISCLOSURE

A film guide plate movably disposed on a stationary aperture plate has two operating positions where it guides one side edge of a moving-picture film while film pressure plates on the stationary aperture plate press the particular threaded film from its other side edge against the guide plate so that the center of an aperture on the stationary aperture plate and the center of an aperture on an auxiliary aperture plate are located on the optical axis of the projector. The auxiliary aperture plate is disposed in sliding movement relation with the rear of the stationary aperture plate. An operating knob on the stationary plate serves to simultaneously change both the auxiliary aperture plate and the guide plate from one to their other positions according to the particular threaded film.

---

This invention relates in general to a small-sized motion-picture projector and more particularly to such a projector for selectively projecting two types of motion-picture film slightly different from each other in format and dimensions including the film width and the perforation pitch.

In order to improve the quality of pictures reproduced from small-sized motion-picture films or to improve the quality of sound reproduced from small-sized sound films, there are, of course, expected the development of the novel types of motion-picture films having a large effective area of one film frame bearing a scene, and/or a sound track changed in position and dimension as compared with the conventional types of double and single width 8 mm. film.

While such novel types of film are certainly advantageous in that the quality of reproduced picture and/or of reproduced sound has been improved any person who intends to use such types of film is required to provide for a separate cinecamera and projector for each of the different types of film. Especially under the existing circumstances that the film types heretofore employed have been already standardized, this standardization is the one and only decided disadvantage for introduction of such novel types of motion-picture film.

In the type of motion-picture projectors of the type by which two types of motion-picture film such as the 8 mm. wide motion-picture film and the 16 mm. wide film can be selectively projected, it has been already known to provide a combination of the main unit and a pair of operating units one for each film type including a intermittent film-transportation mechanism and a continuous film-transportation mechanism, a film gate or aperture etc., the pair of operating units being adapted to be detachably and selectively united to the main unit. However, an unskilled person is not easy to exchange the precise complicated operating units with respect to the main unit. If he attempts to perform such exchanging operation than considerable labour is required with a relatively long time consumed. In addition, since each of the operating units as above described includes almost all the essential projector parts, the selective combination of the operating units with the main projector unit does not result in the provision of inexpensive projectors.

Accordingly, a general object of the invention is to eliminate the abovementioned drawback by providing an improved small-sized motion-picture projector of the type capable of being selectively accommodated with two types of small-sized motion-picture film different in format and dimensions from each other through a simple operation of switching means.

An object of the invention is to provide a small-sized motion-picture projector for selective use with two types of small-sized motion-picture film different in format and dimensions from each other, including improved means for changing both a position to travel a length of film and a picture size in accordance with the type of film involved.

According to the invention there is provided a small-sized motion-picture projector for selective use with two types of small-sized motion-picture film different in picture frame from each other, including an aperture plate device characterized by a main stationary aperture plate having a film aperture formed thereon, an auxiliary movable aperture plate having a film aperture different in dimension from that on the main aperture plate and having its inoperative position and its operative position, the film aperture on said auxiliary aperture plate in its operative position being located in the region of the film aperture on said main aperture plate, a movable film guide plate having two positions to control the lateral position of the film relative to said main aperture plate, and means for moving each of said auxiliary aperture plate and said film guide plate from one of the two positions to the other position.

In a preferred embodiment of the invention the film aperture on the main aperture plate is commensurable in dimension with the picture frame of the type of motion picture film having the larger picture frame and the film aperture on the auxiliary aperture plate being commensurable in dimension with the picture frame of the type of film having the smaller picture frame. The auxiliary aperture plate in its operative position has its film aperture positioned within the film aperture on the main aperture plate.

In order to selectively use two types of small-sized motion-picture film being the same or substantially the same in width but different in frame size and perforation pitch, a separate set of a sprocket wheel for continuously transporting the film and the associated guide element may be detachably mounted in the projector dependent upon the type of film involved with a claw for intermittently transporting the film being changed in stroke of movement.

The invention will become more readily apparent from the following detailed description taken in conjunction with the accompanying drawings in which:

FIG. 1 is a schematic front view of a small-sized motion-picture projector embodying the teachings of the invention;

FIG. 2 is a cross sectional view of an aperture plate device constructed in accordance with the teachings of the invention;

FIG. 3 is a front view of the device illustrated in FIG. 2;

Figure 4:
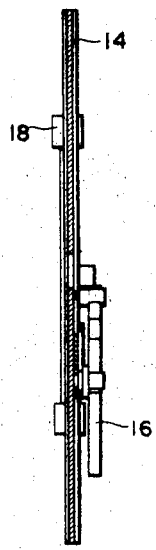
FIG. 4 is a longitudinal sectional view of the device illustrated in FIGS. 2 and 3.

Referring now to FIG. 1, there is illustrated a small-sized motion-picture projector comprising a pair of sprocket wheels 10 and 11 disposed in spaced relationship on a common axis, a pair of guide rollers 12 and 13 and an aperture plate device including a main stationary aperture plate 14. The sprocket wheels and the associated guide rollers may be of the conventional construction and are detachably disposed within a housing for the projector. A separate set of the sprocket wheels and guide rollers is provided for each of small-sized motion-picture film different in format and dimensions from each other. The projector is also provided with an operating knob 16 adapted to change the position of a traveling film relative to the aperture plate 14.

As shown in FIGS. 2, 3, 4 and 5, the aperture plate device is provided with a movable film guide plate 18 for controlling the lateral position of that portion of a small-sized motion-picture film 20 traveling past the main plate 14, with respect to the latter. The film guide plate 18 can be moved widthwise of the film 20 by a pair of elongated slots 22 and 22 and a pair of guiding rods 24 and 24 slidably fitted into the slots respectively, and is continuously pulled in one direction by the action of tensioning a spring 26. The aperture plate device further includes a resilient member in the form of a leaf spring 28 serving to push that portion of the motion-picture film 20 traveling past the aperture plate 14, against the film guide plate 18 and a pair of film pressure plates 30 rockably mounted on the respective pivot pins 32 and 32. In order to ensure that the film guide and pressure plates hold and guide effectively the motion-picture film on the aperture plate, those plates extends through the aperture plate from one face to the other face by having their respective portions extending through openings 34, 34 and 36, 36 formed on the latter.

A feed claw designated at dot-and-dash line 38 in FIG. 3 effects intermittent motion to intermittently feed the film one frame a a time. The claw 38 is designed to change an amount of the film to be fed at a time, or the length of one stroke of the film in accordance with the type of motion-picture film involved or with the perforation pitch of the film used. This may readily be accomplished, for example, by using any suitable lever type claw of the conventional construction and changing the position of its fulcrum about which the claw can rock.

Figure 5:
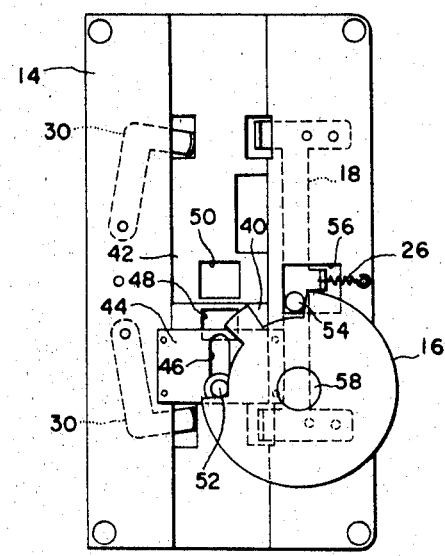
FIG. 5 is a rear view of FIG. 4.

As best shown in FIG. 5, the aperture plate device includes an auxiliary aperture plate 40 slidably carried between a smooth depression 42 on the main aperture plate 14 and a guide plate 44 having an elongated slot 46 formed thereon. The auxiliary aperture plate 40 is provided with an aperture 48 less in dimension and different in shape from an aperture 50 formed on the aperture plate 14 and can effect sliding movement determined by a control pin 52 disposed on the auxiliary plate and the elongated slot 46 into which the control pin 52 is slidably fitted. The film guide plate 18 further includes a control pin 54 extending through an opening 56 formed on the main aperture plate 14 and projecting beyond the rear side of the latter. Both control pins 52 and 54 engage respectively a pair of recesses formed on the periphery of the operating knob 16 rotatable about a pin 58 for the purpose as will be apparent subsequently.

It is now assumed that the movable components of the aperture plate device are in their respective positions illustrated in FIG. 3 in which a certain type of small-sized motion-picture film 20 is transported. Then if another type of small-sized motion-picture film such as shown by the reference numeral 60 in FIG. 6, different in format from the film 20 is desired to be used, the operating knob 16 can be turned in the clockwise direction as viewed in FIG. 5 to cause the auxiliary aperture plate 40 to slide upwardly until the aperture 48 is located within the aperture 50. At the same time, the film guide plate 18 has been moved outwardly or in the righthand direction as viewed in FIG. 5. This is illustrated in FIG. 6.

With the embodiment illustrated it will be appreciated that the main aperture plate 14 has its aperture 50 corresponding to the type of small-sized motion-picture film having the larger picture frame while the auxiliary aperture plate 40 has its aperture 48 corresponding to the type of film having the smaller picture frame.

Figure 6:
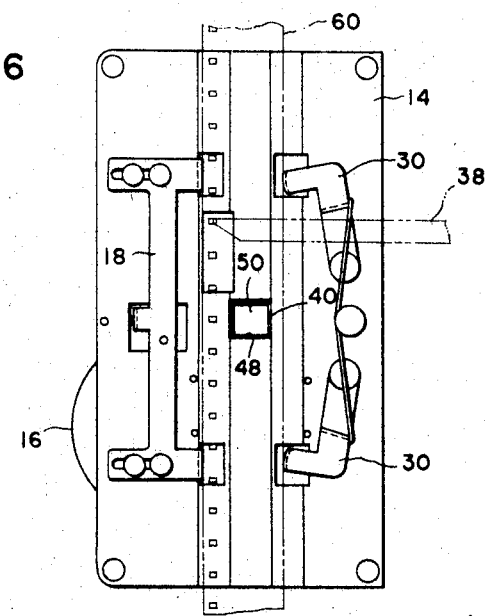
FIG. 6 is a front view of the aperture plate device in its position where it is operatively associated with a motion-picture film different in format from a film illustrated in FIG. 3.

Referring now to FIG. 6 the operating knob 16 has been turned in the counterclockwise direction to upwardly move the auxiliary aperture plate 40 thereby to change the dimension of the film aperture. At the same time the film guide plate 18 was moved in the lefthand direction to displace the position of the traveling film in the lefthand direction.

Under these circumstances, if the operating knob 16 is turned in the clockwise direction as viewed in FIG. 6 or in the counterclockwise direction as viewed in FIG. 5 the auxiliary aperture plate 40 and the film guide plate 18 returned back to their positions illustrated in FIG. 3 where the type of film 20 can be used.

From the foregoing it will be appreciated that the objects of the invention have been accomplished by the provision of the main aperture plate and the auxiliary aperture plate slidably disposed and different in dimension of aperture from the main aperture plate and the cooperation of such aperture plates with the detachable sprocket wheels and guide rollers as well as the variable stroke type claw.

While the invention has been described in conjunction with a preferred embodiment thereof it is to be understood that various changes in the detail of construction and the combination and arrangement of parts may be made without departing from the spirit and scope of the invention.

What we claim is:

1. In a small-sized motion-picture projector for selective use with two types of small-sized motion-picture film different in dimension of picture frame from each other, an aperture plate device including a main stationary aperture plate having a film aperture formed thereon, an auxiliary movable aperture plate having a film aperture different in dimension from that on said main aperture plate and having its inoperative position and its operative position, said film aperture on said auxiliary aperture plate in its operative position having its margin wholly located within the margin of said film aperture on said main aperture plate, laterally shiftable film guide means including a first film guide plate means mounted on said stationary aperture plate generally adjacent one side of the optical vertical axis of the projector and having two different film alignment control positions to control the lateral position of the film relative to said main aperture plate, and means including single lever operating means mounted on said main aperture plate operatively interconnected with and for simultaneously and cooperatively moving each of said auxiliary aperture plate and said film guide plate from one of the two selective positions to the other position.

2. A small-sized motion-picture projector as claimed in claim 1, wherein said auxiliary aperture plate is disposed in sliding movement relation closely adjacent the stationary plate with said film aperture on said main aperture plate being commensurable in dimension with the picture frame of the type of motion-picture film having the larger picture frame and said film aperture on said auxiliary aperture plate being commensurable in dimension with the picture frame of the type of film having the smaller picture frame, and said auxiliary aperture plate in its operative position has its film aperture positioned within the marginal outline of said film aperture on said main aperture plate with both centers of said apertures located on the optical vertical axis of the projector.

3. A small-sized motion-picture projector as defined in claim 1 wherein the laterally shiftable guide plate means further includes secondary guide means also mounted on said stationary aperture plate at the opposite side of said vertical axis, and including means normally biasing a given film strip used in association therewith toward the other of said guide means.

References Cited

UNITED STATES PATENTS

| | | | |
|---|---|---|---|
| 1,413,610 | 4/1922 | Pittman | 352—79 |
| 1,898,173 | 2/1933 | Dina | 352—79 |
| 1,984,264 | 12/1934 | Gualtierotti. | |
| 2,007,018 | 7/1935 | La Porte | 352—80 |

JULIA E. COINER, *Primary Examiner.*

U.S. Cl. X.R.

352—224